(12) United States Patent
Yamamoto et al.

(10) Patent No.: US 8,927,158 B2
(45) Date of Patent: Jan. 6, 2015

(54) NONAQUEOUS ELECTROLYTE SECONDARY BATTERY AND NONAQUEOUS ELECTROLYTIC SOLUTION FOR NONAQUEOUS ELECTROLYTE SECONDARY BATTERY

(75) Inventors: Hidekazu Yamamoto, Kobe (JP); Kouhei Tuduki, Kobe (JP); Taizou Sunano, Kobe (JP); Maruo Kamino, Kobe (JP); Youichi Ohashi, Ibaraki (JP); Minoru Kotato, Ibaraki (JP)

(73) Assignees: SANYO Electric Co., Ltd., Moriguchi-shi (JP); Mitsubishi Chemical Corporation, Tokyo (JP)

( * ) Notice: Subject to any disclaimer, the term of this patent is extended or adjusted under 35 U.S.C. 154(b) by 873 days.

(21) Appl. No.: 13/103,232

(22) Filed: May 9, 2011

(65) Prior Publication Data

US 2011/0274986 A1    Nov. 10, 2011

(30) Foreign Application Priority Data

May 10, 2010 (JP) .................................. 2010-108224

(51) Int. Cl.
| | | |
|---|---|---|
| *H01M 6/18* | (2006.01) | |
| *H01M 4/134* | (2010.01) | |
| *H01M 10/0567* | (2010.01) | |
| *H01M 10/0568* | (2010.01) | |
| *H01M 10/0569* | (2010.01) | |

(52) U.S. Cl.
CPC .......... *H01M 4/134* (2013.01); *H01M 10/0567* (2013.01); *H01M 10/0568* (2013.01); *H01M 10/0569* (2013.01); *Y02E 60/122* (2013.01)

USPC ........ 429/307; 429/342; 429/218.1; 429/332; 429/199; 429/200; 252/62.2

(58) Field of Classification Search
CPC ...................................................... Y02E 60/122
USPC ............. 429/307, 342, 218, 1, 332, 199, 200; 252/62.2
See application file for complete search history.

(56) References Cited

U.S. PATENT DOCUMENTS

2010/0119956 A1  5/2010  Tokuda et al.
2011/0091768 A1  4/2011  Ohashi et al.

FOREIGN PATENT DOCUMENTS

| JP | 2007-242411 A | 9/2007 |
| JP | 2008-277004 A | 11/2008 |
| JP | 2009-87934 A | 4/2009 |
| WO | 2008/126800 A1 | 10/2008 |
| WO | 2010/110159 A1 | 9/2010 |

OTHER PUBLICATIONS

Japanese Office Action dated Sep. 3, 2013, issued in corresponding Japanese Patent Application No. 2010-108224 (2 pages).

*Primary Examiner* — Laura Weiner
(74) *Attorney, Agent, or Firm* — Westerman, Hattori, Daniels & Adrian, LLP

(57) ABSTRACT

A nonaqueous electrolyte secondary battery includes a positive electrode having a positive-electrode active material, a negative electrode having a negative-electrode active material, and a nonaqueous electrolytic solution having a nonaqueous solvent dissolving a solute. The negative-electrode active material includes powdered silicon and/or a silicon alloy, the nonaqueous electrolytic solution includes additives composed of at least one fluorinated lithium phosphate selected from the group consisting of lithium monofluorophosphate, lithium difluorophosphate, and lithium trifluorophosphate and a diisocyanate compound, and the nonaqueous solvent includes a chain carbonate compound.

7 Claims, 2 Drawing Sheets

NONAQUEOUS ELECTROLYTE SECONDARY BATTERY AND NONAQUEOUS ELECTROLYTIC SOLUTION FOR NONAQUEOUS ELECTROLYTE SECONDARY BATTERY

BACKGROUND OF THE INVENTION

1. Field of the Invention

The present invention relates to nonaqueous electrolyte secondary batteries using a negative-electrode active material composed of powdered silicon and/or a silicon alloy and nonaqueous electrolytic solutions for nonaqueous electrolyte secondary batteries.

2. Description of Related Art

Portable electronic equipments, electric power storage systems, and the like have employed, as power sources, nonaqueous electrolyte secondary batteries that use a nonaqueous electrolytic solution through which lithium ions move between a positive electrode and a negative electrode for charging and discharging. Such nonaqueous electrolyte secondary batteries widely use a graphite material as a negative-electrode active material in the negative electrode.

Meanwhile, mobile equipments such as mobile phones, notebook personal computers, and PDAs have been increasingly smaller and lighter in recent years, and multifunctionalization of such equipments requires higher power consumption. Thus, nonaqueous electrolyte secondary batteries that are used as power sources for such equipments have been required to have much lighter weight and much higher capacity.

However, a negative-electrode active material using the graphite material does not have sufficient capacity in the graphite material, and therefore cannot satisfy such requirements.

On this account, it has been studied to use a material capable of forming an alloy with lithium, such as silicon, germanium, and tin, for a negative-electrode active material having high capacity. In particular, silicon has a high theoretical capacity of about 4000 mAh per 1 g. Thus, it has been studied to use silicon or a silicon alloy for the negative-electrode active material.

However, the use of a material capable of forming an alloy with lithium, such as silicon, for the negative-electrode active material leads to a larger volume change associated with absorption and desorption of lithium in comparison with the use of the graphite material for the negative-electrode active material. Hence, a battery using such material has a problem of deterioration due to expansion and contraction by charging and discharging. Furthermore, a material capable of forming an alloy with lithium, such as silicon, is readily reacted with a commonly used nonaqueous electrolytic solution. Thus, the reaction with the nonaqueous electrolytic solution degrades a negative-electrode active material such as silicon to reduce charge and discharge cycle characteristics.

In the present invention, as described later, the nonaqueous electrolytic solution contains additives including at least one fluorinated lithium phosphate selected from the group consisting of lithium monofluorophosphate, lithium difluorophosphate, and lithium trifluorophosphate and a diisocyanate compound.

Japanese Patent Laid-open No. 2008-277004 discloses a nonaqueous electrolyte secondary battery using an electrolytic solution containing lithium difluorophosphate. However, there is no discussion of the effect in the nonaqueous electrolyte secondary battery when it uses a negative-electrode active material composed of powdered silicon and/or a silicon alloy.

Japanese Patent Laid-open No. 2007-242411 discloses a nonaqueous electrolyte secondary battery using an electrolytic solution containing a diisocyanate compound. However, there is no disclosure of the effect when a negative-electrode active material composed of powdered silicon and/or a silicon alloy is used and of the effect when the fluorinated lithium phosphate described above is used in combination.

SUMMARY OF THE INVENTION

The present invention has an object to provide a nonaqueous electrolyte secondary battery that includes a negative-electrode active material composed of powdered silicon and/or a silicon alloy, that suppresses a side reaction between the negative-electrode active material and an electrolytic solution during charging and discharging, and that has improved cycle characteristics.

In an aspect of the present invention, a nonaqueous electrolyte secondary battery includes a positive electrode having a positive-electrode active material, a negative electrode having a negative-electrode active material, and a nonaqueous electrolytic solution having a nonaqueous solvent dissolving a solute. The negative-electrode active material includes powdered silicon and/or a silicon alloy, the nonaqueous electrolytic solution includes additives having at least one fluorinated lithium phosphate selected from the group consisting of lithium monofluorophosphate, lithium difluorophosphate, and lithium trifluorophosphate and a diisocyanate compound, and the nonaqueous solvent includes a chain carbonate compound.

In the present invention, the nonaqueous electrolytic solution includes additives containing the fluorinated lithium phosphate and the diisocyanate compound. Furthermore, the nonaqueous solvent includes the chain carbonate compound. The presence of such components in the nonaqueous electrolytic solution suppresses a side reaction between the negative-electrode active material and the electrolytic solution during charging and discharging and improves cycle characteristics.

The fluorinated lithium phosphate used in the present invention is particularly preferably lithium difluorophosphate.

In the nonaqueous electrolytic solution, the content of at least one fluorinated lithium phosphate selected from the group consisting of lithium monofluorophosphate, lithium difluorophosphate, and lithium trifluorophosphate is preferably in a range of 0.001% by mass to 5% by mass, more preferably in a range of 0.01% by mass to 3% by mass, and most preferably in a range of 0.1% by mass to 2% by mass, with respect to the total mass of the nonaqueous electrolytic solution. An excessively low content of such compound may interfere with the formation of a sufficient film on the negative-electrode active material and thus the side reaction between the negative-electrode active material and the electrolytic solution may not be sufficiently suppressed during charging and discharging. An excessively high content of such compound may decrease charge and discharge efficiency.

The diisocyanate compound used in the present invention may be various diisocyanate compounds. An alkylene diisocyanate compound is particularly preferably used.

The alkylene diisocyanate compound preferably has an aliphatic hydrocarbon group having a carbon number of 6 or more and 12 or less. Specific examples of such alkylene diisocyanate compound include 1,6-diisocyanatohexane, 1,7-diisocyanatoheptane, 1,8-diisocyanatooctane, 1,9-diisocyanatononane, 1,10-diisocyanatodecane, 1,11-diisocyanatoundecane, and 1,12-diisocyanatododecane.

The content of the diisocyanate compound in the nonaqueous electrolytic solution is preferably in a range of 0.01% by volume to 10% by volume, more preferably in a range of 0.1% by volume to 5% by volume, and particularly preferably in a range of 0.5% by volume to 3% by volume, with respect to the nonaqueous electrolytic solution except solutes. An excessively low content of the diisocyanate compound may interfere with the formation of a sufficient film on the negative-electrode active material and thus the side reaction between the negative-electrode active material and the electrolytic solution may not be sufficiently suppressed during charging and discharging. An excessively high content of the diisocyanate compound may increase resistance in the battery to reduce the battery capacity.

In the present invention, examples of the chain carbonate compound used as the nonaqueous solvent include dimethyl carbonate, methyl ethyl carbonate, diethyl carbonate, methyl propyl carbonate, ethyl propyl carbonate, and dipropyl carbonate. These compounds may be used alone or may be used in combination of two or more of them, as the chain carbonate compound. Furthermore, a chain carbonate compound that is formed by substituting some or all of the hydrogen atoms in such compound with fluorine atoms may be used.

The content of the chain carbonate compound in the nonaqueous electrolytic solution is preferably in a range of 50% by volume to 95% by volume, more preferably in a range of 60% by volume to 90% by volume, and particularly preferably in a range of 70% by volume to 85% by volume. An excessively low content of the chain carbonate compound may interfere with the stability of the film on the negative-electrode active material formed from the fluorinated lithium phosphate and the diisocyanate compound and thus the side reaction between the negative-electrode active material and the electrolytic solution may not be sufficiently suppressed during charging and discharging. An excessively high content of the chain carbonate compound may reduce a conductivity of the electrolytic solution.

In the present invention, it is preferable that the nonaqueous solvent further includes a fluorinated cyclic carbonate. Specific examples of the fluorinated cyclic carbonate include fluorinated cyclic carbonate derivatives such as 4-fluoro-1,3-dioxolan-2-one, 4,5-difluoro-1,3-dioxolan-2-one, 4,4-difluoro-1,3-dioxolan-2-one, 4-fluoro-5-methyl-1,3-dioxolan-2-one, 4-fluoro-4-methyl-1,3-dioxolan-2-one, and 4-trifluoromethyl-1,3-dioxolan-2-one.

Preferably used fluorinated cyclic carbonate derivatives are 4-fluoro-1,3-dioxolan-2-one and 4,5-difluoro-1,3-dioxolan-2-one, and particularly preferably used is 4-fluoro-1,3-dioxolan-2-one. Using such fluorinated ethylene carbonate further improves the charge and discharge cycle characteristics.

The content of the fluorinated cyclic carbonate in the nonaqueous electrolytic solution is preferably in a range of 5% by volume to 50% by volume, more preferably in a range of 10% by volume to 40% by volume, and particularly preferably in a range of 15% by volume to 30% by volume. An excessively low content of the fluorinated cyclic carbonate may reduce the cycle characteristics. An excessively high content of the fluorinated cyclic carbonate may increase gas generation during storage at high temperature.

In the present invention, the solute dissolved in the nonaqueous solvent may be a lithium salt that is commonly used in nonaqueous electrolyte secondary batteries. Examples of such lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and a mixture of them. The solute preferably contains a lithium salt that includes an anionic part having an oxalate complex in addition to the lithium salt. Examples of the lithium salt including an anionic part having an oxalate complex include lithium bis(oxalate)borate.

The content of the solute in the nonaqueous electrolytic solution is, but not necessarily limited to, commonly preferably in a range of 0.5 mol/liter to 2 mol/liter, more preferably in a range of 0.6 mol/liter to 1.8 mol/liter, and particularly preferably in a range of 0.7 mol/liter to 1.7 mol/liter.

In the present invention, the negative-electrode active material employs powdered silicon and/or a silicon alloy. The film that is formed from the fluorinated lithium phosphate and the diisocyanate compound is formed on the surface of such negative-electrode active material, and suppresses the side reaction between the negative-electrode active material and the electrolytic solution to improve the cycle characteristics.

Examples of the silicon alloy used for the negative-electrode active material include a solid solution composed of silicon and one or more other elements, an intermetallic compound composed of silicon and one or more other elements, and a eutectic alloy composed of silicon and one or more other elements.

Such silicon alloy can be produced by a known method such as an arc melting method, a liquid quenching method, a mechanical alloying method, a sputtering method, a chemical vapor deposition method, and a baking method. Examples of the liquid quenching method include a single-roller quenching method, a twin-roller quenching method, and various atomizing methods such as a gas-atomizing method, a water-atomizing method, and a disk-atomizing method.

The negative electrode in the present invention preferably has a negative electrode mixture layer that includes the negative-electrode active material composed of powdered silicon and/or a silicon alloy and a binder on a negative electrode collector. It is preferable that the formed negative electrode mixture layer composed of the negative-electrode active material and the binder on the negative electrode collector is sintered at a glass transition temperature of the binder or more in a non-oxidizing atmosphere to produce the negative electrode. The sintering at a glass transition temperature of the binder or more improves adhesions among the negative-electrode active material and between the negative-electrode active material and the negative electrode collector. In order to further improve the adhesion among the negative-electrode active material and the adhesion between the negative-electrode active material and the negative electrode collector and to suppress separation of the negative-electrode active material from the negative electrode collector due to expansion and contraction of the negative-electrode active material during charging and discharging, it is preferable that the formed negative electrode mixture layer on the negative electrode collector is rolled and then sintered.

The binder is preferably a polyimide resin. By using the polyimide resin, the negative electrode can be sintered at a glass transition temperature of the binder or more. This can improve the adhesions among the negative-electrode active material and between the negative-electrode active material and the negative electrode collector and suppress deterioration due to expansion of the negative-electrode active material composed of powdered silicon and/or a silicon alloy during charging and discharging.

The temperature for sintering the negative electrode is preferably a glass transition temperature of the binder or more as described above, and is preferably in a range of 200 to 500° C. for the polyimide resin.

The non-oxidizing atmosphere is preferably an atmosphere of an inert gas such as argon and a nitrogen gas atmosphere. It may be a reducing atmosphere such as a hydrogen gas atmosphere.

The negative electrode collector preferably has a surface roughness Ra of 0.2 μm or more. The negative electrode collector having a surface roughness Ra of 0.2 μm or more enlarges a contact area between the negative-electrode active material and the negative electrode collector and ensures penetration of the binder into a concave-convex part of a surface on the negative electrode collector. Sintering in this condition also provides anchor effect. Therefore, such sintering largely improves the adhesion between the negative-electrode active material and the negative electrode collector and further suppresses the separation of the negative-electrode active material from the negative electrode collector due to expansion and contraction of the negative-electrode active material during charging and discharging.

In the nonaqueous electrolyte secondary battery of the present invention, the positive-electrode active material used for the positive electrode may be a known positive-electrode active material commonly used. Examples of the positive-electrode active material include lithium-containing transition-metal oxides including a lithium-cobalt composite oxide such as $LiCoO_2$, a lithium-nickel composite oxide such as $LiNiO_2$, a lithium-manganese composite oxide such as $LiMn_2O_4$ and $LiMnO_2$, a lithium-nickel-cobalt composite oxide such as $LiNi_{1-x}CO_xO_2$ (0<x<1), a lithium-manganese-cobalt composite oxide such as $LiMn_{1-x}CO_xO_2$ (0<x<1), a lithium-nickel-cobalt-manganese composite oxide such as $LiNi_xCO_yMn_zO_2$ (x+y+z=1), and a lithium-nickel-cobalt-aluminum composite oxide such as $LiNi_xCO_yAl_zO_2$ (x+y+z=1).

Here, the lithium cobalt oxide $LiCoO_2$ for the positive-electrode active material desirably has a surface fixed with zirconium. This stabilizes a crystal structure of the lithium cobalt oxide to improve charge and discharge cycle characteristics and to suppress side reactions other than the charge and discharge reaction on an interface to the nonaqueous electrolytic solution.

The nonaqueous electrolytic solution of the present invention includes a nonaqueous solvent and solutes that are dissolved in the nonaqueous solvent, and is a nonaqueous electrolytic solution used for the nonaqueous electrolyte secondary battery that includes an active material composed of powdered silicon and/or a silicon alloy. It contains additives including at least one fluorinated lithium phosphate selected from the group consisting of lithium monofluorophosphate, lithium difluorophosphate, and lithium trifluorophosphate and a diisocyanate compound, and contains the nonaqueous solvent including a chain carbonate compound.

Using the nonaqueous electrolytic solution of the present invention can suppress a side reaction between the negative-electrode active material and the electrolytic solution during charging and discharging and improve cycle characteristics.

According to the present invention, in a nonaqueous electrolyte secondary battery including a negative-electrode active material composed of powdered silicon and/or a silicon alloy, a film can be formed on the negative-electrode active material from at least one fluorinated lithium phosphate selected from the group consisting of lithium monofluorophosphate, lithium difluorophosphate, and lithium trifluorophosphate and a diisocyanate compound. Moreover, a chain carbonate compound included in the nonaqueous solvent stabilizes the film in the nonaqueous electrolytic solution. The presence of the film suppresses a side reaction between the negative-electrode active material and the electrolytic solution during charging and discharging. Therefore, the nonaqueous electrolyte secondary battery obtains improved charge and discharge cycle characteristics.

DETAILED DESCRIPTION OF THE PREFERRED EXAMPLES

Figure 1:
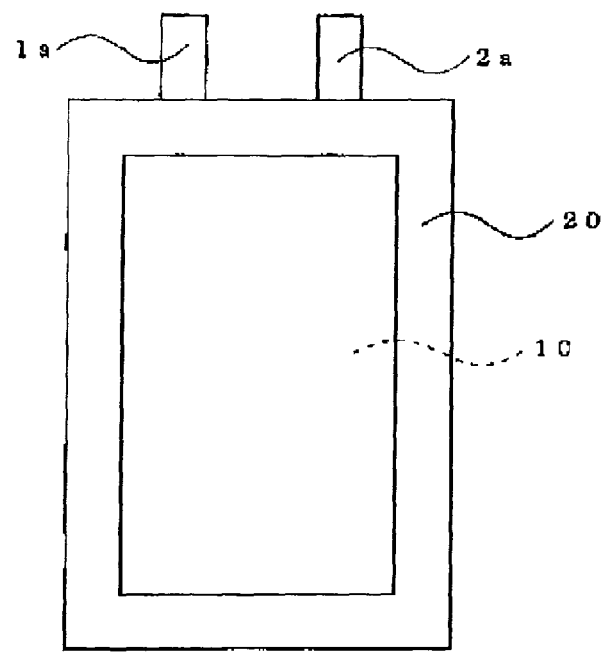
FIG. 1 is a plan view showing a nonaqueous electrolyte secondary battery prepared in Examples of the present invention.

Specific examples of the present invention will be described as follows, but the present invention is not limited to these examples, and can be implemented in various forms within its scope.

Example 1

[Preparation of the Positive Electrode]

The positive-electrode active material used was lithium cobalt oxide represented by $LiCoO_2$ (an average particle diameter of 13 μm, a BET specific surface area of 0.35 $m^2/g$) having a surface fixed with a zirconium compound. The lithium cobalt oxide having the surface adhered with the zirconium compound can be produced by adding the zirconium compound into the raw material and burning the mixture.

The positive-electrode active material, a carbon material powder as a conductive agent, and polyvinylidene fluoride as a binder were mixed so as to have a mass ratio of 95:2.5:2.5. Into the mixture, an N-methyl-2-pyrrolidone solution was added and kneaded to prepare a positive electrode mixture slurry.

Next, an aluminum foil positive electrode collector having a thickness of 15 μm, a length of 402 mm, and a width of 50 mm was coated with the positive electrode mixture slurry on one side of the positive electrode collector in a length of 340 mm and a width of 50 mm and on the other side in a length of 271 mm and a width of 50 mm. The coated collector was dried and rolled to prepare a positive electrode. Here, the positive electrode had a thickness of 143 μm, the amount of the positive electrode mixture was 48 mg/$cm^2$ on the positive electrode collector, and the positive electrode mixture had a packing density of 3.75 g/$cm^3$.

Then, onto the area without coating the positive electrode mixture on the positive electrode, a positive electrode current collecting tab made from an aluminum plate having a thickness of 70 μm, a length of 35 mm, and a width of 4 mm was attached.

[Preparation of the Negative Electrode]

The negative-electrode active material used was a silicon powder (a purity of 99.9% by mass) having an average particle diameter of 10 μm.

The negative-electrode active material, a graphite powder as a conductive agent, and a thermoplastic polyimide having a glass transition temperature of 295° C. as a binder were mixed so as to have a mass ratio of 87:3:7.5. Into the mixture, an N-methyl-2-pyrrolidone solution was added and kneaded to prepare a negative electrode mixture slurry.

Then, the negative electrode mixture slurry was coated on both sides of a negative electrode collector made from a Cu—Ni—Si—Mg (Ni: 3% by mass, Si: 0.65% by mass, Mg: 0.15% by mass) alloy foil having a surface roughness Ra of 0.3 µm and a thickness of 20 µm, and then the coated collector was dried. Here, the amount of the negative electrode mixture was 5.6 mg/cm$^2$ on the negative electrode collector.

Next, the negative electrode collector coated with the negative electrode mixture as above was cut into a rectangle having a length of 380 mm and a width of 52 mm, rolled, and heat-treated in an argon atmosphere at 400° C. for 10 hours for sintering to prepare a negative electrode. The negative electrode had a thickness of 56 µm after the sintering.

Then, onto an edge of the negative electrode, a negative electrode current collecting tab made from a nickel plate having a thickness of 70 µm, a length of 35 mm, and a width of 4 mm was attached.

[Preparation of the Nonaqueous Electrolytic Solution]

The nonaqueous solvents used were 4-fluoro-1,3-dioxolan-2-one (fluoroethylene carbonate: FEC) and dimethyl carbonate (DMC). The additive used was 1,6-diisocyanatohexane (HMDI). FEC, DMC, and HMDI were mixed in a volume ratio of 20:79:1 to prepare a mixed solvent. Into the mixed solvent, LiPF$_6$ was dissolved as a solute so as to have a concentration of 1.0 mol/liter, and lithium difluorophosphate (LiPF$_2$O$_2$) was further dissolved so as to have a concentration of 1.0% by mass. Into the mixture, carbon dioxide gas was dissolved in 0.4% by mass to prepare a nonaqueous electrolytic solution.

[Preparation of the Nonaqueous Electrolyte Secondary Battery]

The positive electrode, the negative electrode, and the nonaqueous electrolytic solution prepared above were used to prepare a nonaqueous electrolyte secondary battery. The positive electrode and the negative electrode were placed so as to oppose each other with a separator interposed therebetween. The whole was wound so as to be bent at predetermined positions and then pressed to prepare a flat-shaped electrode assembly.

Figure 2:
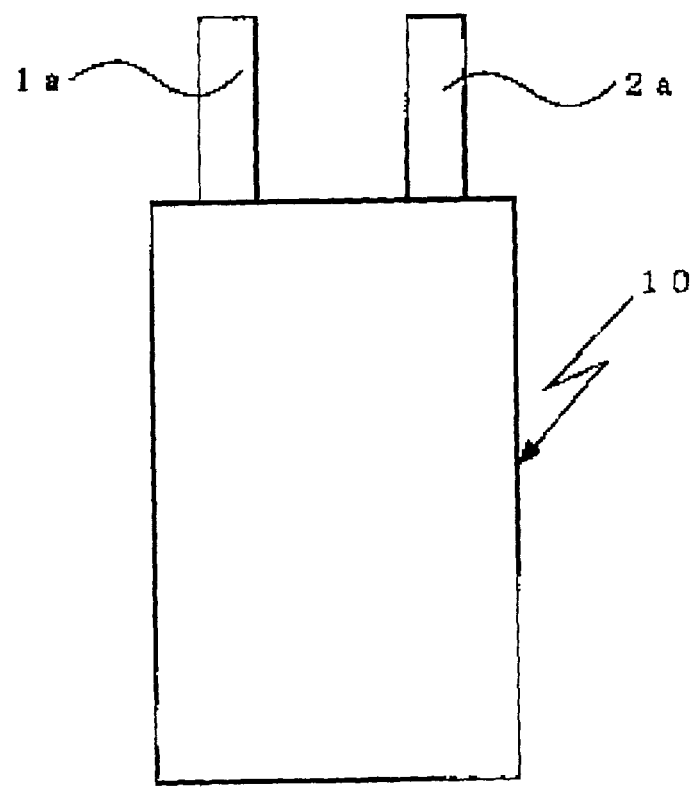
FIG. 2 is a plan view showing an electrode assembly prepared in Examples of the present invention.
Figure 3:
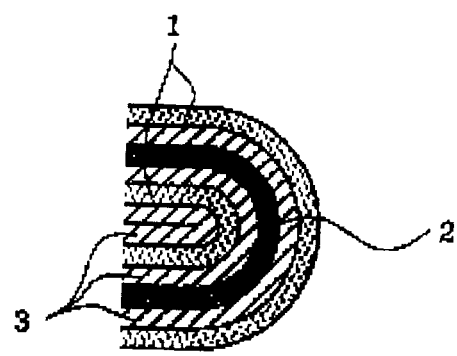
FIG. 3 is a partial cross-sectional view showing the electrode assembly prepared in Examples of the present invention.

FIG. 2 shows the electrode assembly 10 prepared, and FIG. 3 is a partial cross-sectional view of the electrode assembly 10. As shown in FIG. 3, the separator 3 is interposed between the positive electrode 1 and the negative electrode 2, and the whole is wound. For the separator 3, two pieces of separators made of porous polyethylene having a thickness of 22 µm, a length of 430 mm, and a width of 54.5 mm were used.

As shown in FIG. 2, the electrode assembly 10 was prepared so that the positive electrode current collecting tab 1*a* connected to the positive electrode 1 and the negative electrode current collecting tab 2*a* connected to the negative electrode 2 would protrude from the electrode assembly 10.

FIG. 1 is a plan view showing the nonaqueous electrolyte secondary battery prepared by using the electrode assembly shown in FIG. 2. As shown in FIG. 1, in a battery container made from an aluminum laminate film, the electrode assembly 10 is placed. Into the battery container 20, the nonaqueous electrolytic solution was added. An opening of the battery container 20 was sealed while pulling out the positive electrode current collecting tab 1*a* and the negative electrode current collecting tab 2*a* to prepare a nonaqueous electrolyte secondary battery. The nonaqueous electrolyte secondary battery prepared had a design capacity of 950 mAh.

Example 2

A nonaqueous electrolyte secondary battery was prepared in the same manner as in Example 1 except that 1,12-diisocyanatododecane (DMDI) was used as the diisocyanate compound in place of HMDI.

Example 3

A nonaqueous electrolyte secondary battery was prepared in the same manner as in Example 1 except that the content of LiPF$_2$O$_2$ was 0.5% by mass in the nonaqueous electrolytic solution.

Example 4

A nonaqueous electrolyte secondary battery was prepared in the same manner as in Example 1 except that the volume ratio of FEC:DMC:HMDI was 20:79.5:0.5 and the content of LiPF$_2$O$_2$ was 0.5% by mass.

Comparative Example 1

A nonaqueous electrolyte secondary battery was prepared in the same manner as in Example 1 except that neither LiPF$_2$O$_2$ nor HMDI was added and the content of DMC was 80% by volume.

Comparative Example 2

A nonaqueous electrolyte secondary battery was prepared in the same manner as in Example 1 except that LiPF$_2$O$_2$ alone was added at 1% by mass as the additive.

Comparative Example 3

A nonaqueous electrolyte secondary battery was prepared in the same manner as in Example 1 except that HMDI alone was added at 1% by volume as the additive and the content of DMC was 79% by volume.

Comparative Example 4

A nonaqueous electrolyte secondary battery was prepared in the same manner as in Example 1 except that hexyl isocyanate was used as the additive in place of HMDI.

Comparative Example 5

A nonaqueous electrolyte secondary battery was prepared in the same manner as in Example 1 except that methyl propionate (MP) was used at 79% by volume in place of DMC.

Comparative Example 6

A nonaqueous electrolyte secondary battery was prepared in the same manner as in Example 1 except that neither LiPF$_2$O$_2$ nor HMDI was added and MP was used at 80% by volume in place of DMC.

[Evaluation of the Nonaqueous Electrolyte Secondary Batteries]

Each nonaqueous electrolyte secondary battery of Examples 1 to 4 and Comparative Examples 1 to 6 was charged at a constant current of 190 mA until the voltage reached 4.2 V, further charged at a constant voltage of 4.2 V until the current value reached 48 mA, and then discharged at a constant current of 190 mA until the voltage reached 2.75 V, at an ambient condition of 25° C. for initial charging and discharging.

Next, each nonaqueous electrolyte secondary battery of Examples 1 to 4 and Comparative Examples 1 to 6 initially charged and discharged as above was charged at a constant current of 950 mA until the voltage reached 4.2 V, further charged at a constant voltage of 4.2 V until the current value reached 48 mA, and then discharged at a constant current of 950 mA until the voltage reached 2.75 V, at a temperature condition of 25° C. This charging and discharging operation was regarded as 1 cycle and repeated 300 cycles.

On each nonaqueous electrolyte secondary battery of Examples 1 to 4 and Comparative Examples 1 to 6, the discharge capacity Q1 of the first cycle and the discharge capacity Q300 of the 300th cycle were determined. Then, each capacity retention ratio at the 300th cycle in an ambient condition of 25° C. was calculated by the formula below.

Capacity retention ratio=($Q300/Q1$)×100

Table 1 shows the composition of the electrolytic solution and the capacity retention ratio of each battery of Examples 1 to 4 and Comparative Examples 1 to 6.

TABLE 1

| | Electrolytic solution composition | Electrolytic solution composition (% by volume) | | | | | Electrolytic solution composition | Cycle characteristics |
|---|---|---|---|---|---|---|---|---|
| | (mol/l) LiPF$_6$ | FEC | DMC | MP | HMDI | DMDI | Hexyl isocyanate | (% by mass) LiPF$_2$O$_2$ | (capacity retention ratio (%)) |
| Ex. 1 | 1 | 20 | 79 | — | 1 | — | — | 1 | 58 |
| Ex. 2 | 1 | 20 | 79 | — | — | 1 | — | 1 | 59 |
| Ex. 3 | 1 | 20 | 79 | — | 1 | — | — | 0.5 | 55 |
| Ex. 4 | 1 | 20 | 79.5 | — | 0.5 | — | — | 0.5 | 56 |
| Comp. Ex. 1 | 1 | 20 | 80 | — | — | — | — | — | 51 |
| Comp. Ex. 2 | 1 | 20 | 80 | — | — | — | — | 1 | 47 |
| Comp. Ex. 3 | 1 | 20 | 79 | — | 1 | — | — | — | 49 |
| Comp. Ex. 4 | 1 | 20 | 79 | — | — | — | 1 | 1 | 47 |
| Comp. Ex. 5 | 1 | 20 | — | 79 | 1 | — | — | 1 | 49 |
| Comp. Ex. 6 | 1 | 20 | — | 80 | — | — | — | — | 49 |

Table 1 shows that each battery of Examples 1 to 4 having the electrolytic solution composition including a nonaqueous electrolytic solution that contained a fluorinated lithium phosphate composed of LiPF$_2$O$_2$ and a diisocyanate compound composed of HMDI or DMDI as the additives and contained a nonaqueous solvent composed of DMC as the chain carbonate compound had a higher capacity retention ratio as compared with the battery of Comparative Example 1 that included neither the fluorinated lithium phosphate nor the diisocyanate compound as the additives. This reveals that each battery of Examples 1 to 4 had excellent charge and discharge cycle characteristics.

Furthermore, each battery of Examples 1 to 4 had a higher capacity retention ratio as compared with the battery of Comparative Example 2 that included only the fluorinated lithium phosphate and the battery of Comparative Example 3 that included only the diisocyanate compound. This reveals that the presence of both the fluorinated lithium phosphate and the diisocyanate compound as the additives improves the charge and discharge cycle characteristics.

Each nonaqueous electrolyte secondary battery of Comparative Example 2 and Comparative Example 3 had lower charge and discharge cycle characteristics than the nonaqueous electrolyte secondary battery of Comparative Example 1. This reveals that the presence of one of the fluorinated lithium phosphate and the diisocyanate compound reduces charge and discharge cycle characteristics when powdered silicon and/or a silicon alloy are used as the negative-electrode active material.

Comparative Example 4 reveals that the presence of a monoisocyanate compound, hexyl isocyanate, as the isocyanate compound did not improve cycle characteristics.

As apparent from a comparison of Comparative Example 5 with Comparative Example 6, it is revealed that the absence of a chain carbonate compound did not improve charge and discharge cycle characteristics even when the fluorinated lithium phosphate and the diisocyanate compound were added as the additives. This is supposed to be because a film formed from the fluorinated lithium phosphate and the diisocyanate compound can stably exist in the presence of the chain carbonate compound but it cannot stably exist in the absence of the chain carbonate compound not to improve charge and discharge cycle characteristics.

Hence, according to the present invention, the addition of additives composed of at least one fluorinated lithium phosphate selected from the group consisting of lithium monofluorophosphate, lithium difluorophosphate, and lithium trifluorophosphate and a diisocyanate compound to the nonaqueous electrolytic solution forms a film on the surface of the negative-electrode active material to suppress a side reaction between the negative-electrode active material and the electrolytic solution, and the film can stably exist in the presence of the chain carbonate compound. It is considered that the film can suppress the side reaction between the negative-electrode active material and the electrolytic solution during charging and discharging to improve charge and discharge cycle characteristics.

What is claimed is:

1. A nonaqueous electrolyte secondary battery comprising:
a positive electrode including a positive-electrode active material;
a negative electrode including a negative-electrode active material; and
a nonaqueous electrolytic solution comprising a nonaqueous solvent and a solute, wherein the solute is dissolved in the nonaqueous solvent,
wherein:
the negative-electrode active material comprises powdered silicon and/or a silicon alloy;
the nonaqueous electrolytic solution comprises additives having at least one fluorinated lithium phosphate selected from the group consisting of lithium monofluorophosphate, lithium difluorophosphate, and lithium trifluorophosphate and an alkylene diisocyanate compound containing an aliphatic hydrocarbon group having 6 to 12 carbon atoms; and the nonaqueous solvent comprises a chain carbonate compound.

2. The nonaqueous electrolyte secondary battery according to claim 1, wherein:

the fluorinated lithium phosphate is lithium difluorophosphate.

3. The nonaqueous electrolyte secondary battery according to claim 1, wherein:

the chain carbonate compound is dimethyl carbonate.

4. The nonaqueous electrolyte secondary battery according to claim 1, wherein:

the nonaqueous solvent further comprises a fluorinated cyclic carbonate.

5. The nonaqueous electrolyte secondary battery according to claim 1, wherein the alkylene diisocyanate compound containing an aliphatic hydrocarbon group having 6 to 12 carbon atoms is at least one selected from the group consisting of 1,6-diisocyanatohexane, 1,7-diisocyanatoheptane, 1,8-diisocyanatooctane, 1,9-diisocyanatononane, 1,10-diisocyanatodecane, 1,11-diisocyanatoundecane, and 1,12-diisocyanatododecane.

6. A nonaqueous electrolytic solution adapted for use in a nonaqueous electrolyte secondary battery, wherein the nonaqueous electrolyte secondary battery comprises a negative-electrode active material and the negative-electrode active material comprises a powdered silicon and/or a silicon alloy, the nonaqueous electrolytic solution comprising:

a nonaqueous solvent; and a solute dissolved in the nonaqueous solvent, wherein the solute comprises additives having at least one fluorinated lithium phosphate selected from the group consisting of lithium monofluorophosphate, lithium difluorophosphate, and lithium trifluorophosphate and an alkylene diisocyanate compound containing an aliphatic hydrocarbon group having 6 to 12 carbon atoms; and the nonaqueous solvent comprises a chain carbonate compound.

7. The nonaqueous electrolytic solution according to claim 6, wherein the alkylene diisocyanate compound containing an aliphatic hydrocarbon group having 6 to 12 carbon atoms is at least one selected from the group consisting of 1,6-diisocyanatohexane, 1,7-diisocyanatoheptane, 1,8-diisocyanatooctane, 1,9-diisocyanatononane, 1,10-diisocyanatodecane, 1,11-diisocyanatoundecane, and 1,12-diisocyanatododecane.

* * * * *